No. 661,970. Patented Nov. 20, 1900.
M. GARLAND.
CONVEYER PULLEY.
(Application filed June 22, 1900.)
(No Model.)

Witnesses:
W. Stephens
C. D. Wilson.

Michael Garland
by Geo. B. Willcox, Attorney

UNITED STATES PATENT OFFICE.

MICHAEL GARLAND, OF BAY CITY, MICHIGAN, ASSIGNOR TO THE M. GARLAND COMPANY, OF SAME PLACE.

CONVEYER-PULLEY.

SPECIFICATION forming part of Letters Patent No. 661,970, dated November 20, 1900.

Application filed June 22, 1900. Serial No. 21,136. (No model.)

*To all whom it may concern:*

Be it known that I, MICHAEL GARLAND, a citizen of the United States, residing at Bay City, in the county of Bay and State of Michigan, have invented certain new and useful Improvements in Conveyer-Pulleys; and I do hereby declare the following to be a full, clear, and exact description of the invention, such as will enable others skilled in the art to which it appertains to make and use the same.

This invention relates to conveyers and like machinery, and pertains more particularly to the construction of the sheaves or pulleys over which conveyer-chains run; and the improvement consists in the means which I have invented for adjusting and regulating the width of the chain-carrying groove, whereby the objects of my invention are accomplished.

Heretofore it has been customary to provide pulleys of this class with chain-grooves having a slight taper toward the bottom in order to grip the chain tightly and permit the pulley to transmit its power to the chain without slipping; but it is found in practice that the links of the chain stretch after continued use and wear the grooves out of shape, so that the pulley begins to slip and rapidly loses its efficiency as a power-transmitter. Various devices have been produced to overcome this defect, but have so far failed to satisfactorily accomplish the desired results. I have succeeded in producing a conveyer-chain pulley that is simple in construction, requiring very little machine-work, of great strength, and easily adjusted to suit any conditions of wear or stretch of the conveyer-chain. The parts are interchangeable and can readily be replaced if damaged.

Figure 1:
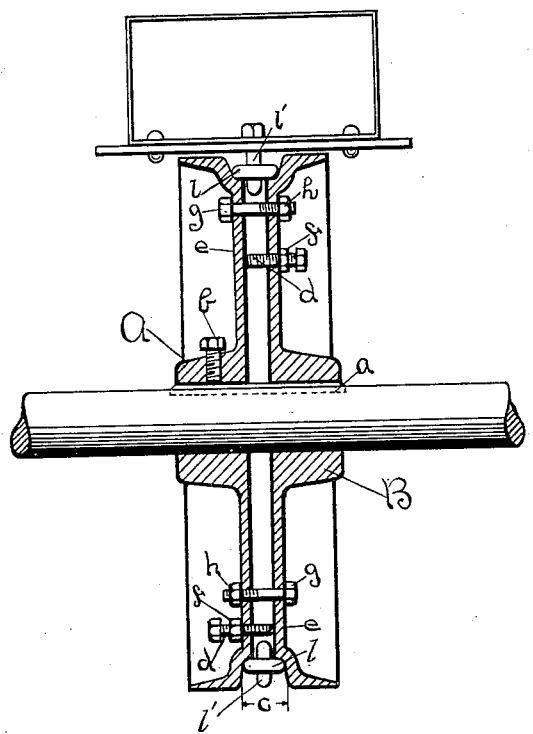
Figure 2:
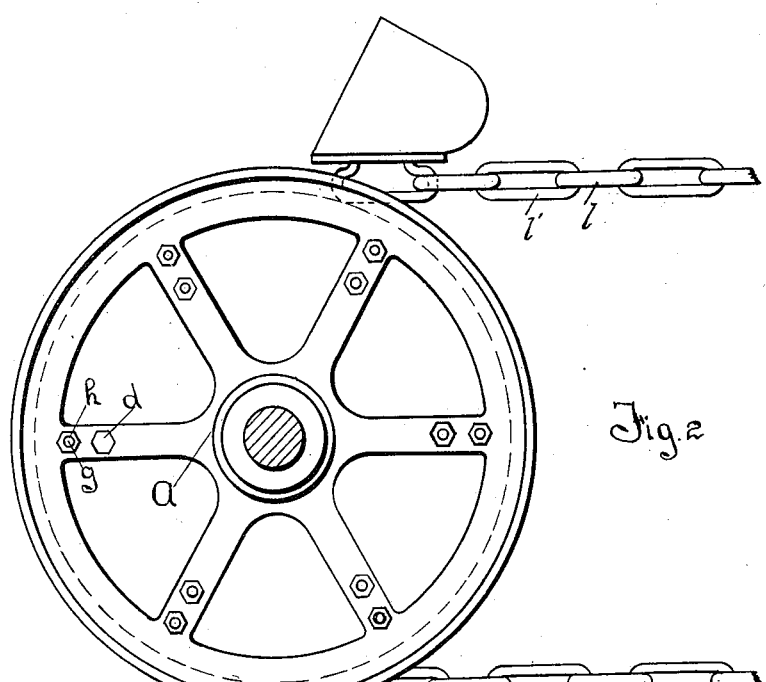

In the accompanying drawings, Figure 1 is a section of the pulley, and Fig. 2 is a side view.

The pulley is of the two-part type, being divided transverse to the axis in the plane of the center line of the chain-groove or near the center line. One part A is secured to the shaft by means of a key $a$ and set-bolt $b$ or other suitable device and the other part B has longitudinal adjustment along the shaft and the key $a$. The width of the chain-groove $c$ can be varied as desired by moving the part B toward or away from the part A along the shaft. To accomplish this adjustment within the limits established in practice, I provide a series of bolts $d$ at convenient distances from the rim, whereby the two parts of the wheel can be forced apart any desired amount. I have found it satisfactory in practice to tap holes in the arms of the pulley, into which the bolts $d$ are screwed, the end of each bolt bearing against the inner face of the opposing arm $e$ to regulate the distance between the two parts of the pulley. A set-nut $f$ may be provided on the bolt $d$ to prevent loosening.

To prevent the two parts A and B from separating I bolt them together firmly by means of through-bolts $g$ and nuts $h$. These bolts may be, like the bolts $d$, either secured to the arms of the pulley or to suitable flanges or lugs provided on the parts A and B, the particular location of the bolts being immaterial to my invention, the spirit of which is found in the combination of the relatively adjustable parts A and B and the bolts for adjusting the distance between them, together with bolts or equivalent means for binding the parts together when adjusted.

An important advantage of this construction is that the horizontal link $l$ of the chain is firmly gripped at its edges along the pitch-line of the chain, thereby transmitting the necessary pressure to the chain-link for driving the conveyer and avoiding any grinding movement between the edge of the link and the groove. The space between the parts A and B is sufficiently wide to prevent gripping the lower part of the vertical link $l'$.

What I claim is—

1. A pulley for driving conveyer-chains, comprising two sections, each substantially of the form of half a solid chain-pulley that has been divided on the plane of its chain-groove; means carried by said pulley for adjusting the space between said sections; and means carried by said pulley for clamping the sections in their adjusted position, whereby the groove is conformed in width to the width of the conveyer-chain links and is adjustably adapted to grip the links.

2. In a conveyer-pulley comprising a fixed section and a section movable along the shaft toward or from the fixed section; means for adjusting said sections relatively to each other, comprising in combination set-bolts screwed into one section and bearing against the other section, and bolts passing through both sections for clamping said sections in position, substantially as described and for the purposes set forth.

3. A separable grooved pulley for conveyers and the like comprising two sections, each section being of the form of half a solid grooved pulley that has been divided on the central plane of its groove; one of said sections being fixed to the pulley-shaft and the other section being movable along the shaft; set-bolts carried by one of said sections and bearing against the other section; and tie-bolts passing through both sections for clamping them together, substantially as described.

In testimony whereof I affix my signature in presence of two witnesses.

MICHAEL GARLAND.

Witnesses:
GEO. B. WILLCOX,
WM. STEPHENS.